United States Patent [19]
Piercey

[11] Patent Number: 5,557,188
[45] Date of Patent: Sep. 17, 1996

[54] SMART BATTERY SYSTEM AND INTERFACE

[75] Inventor: Lawrence E. Piercey, San Jose, Calif.

[73] Assignee: Sun Microsystems, Inc., Mountain View, Calif.

[21] Appl. No.: 190,669

[22] Filed: Feb. 1, 1994

[51] Int. Cl.$^6$ .............................. G01R 19/00; H02J 7/04
[52] U.S. Cl. .................... 320/5; 320/22; 320/24
[58] Field of Search .................... 320/5, 22–24, 320/20–21, 35–38, 31, 39

[56] References Cited

U.S. PATENT DOCUMENTS

| | | | |
|---|---|---|---|
| 4,554,500 | 11/1985 | Sokira | 320/31 |
| 4,965,738 | 10/1990 | Bauer et al. | 320/48 |

FOREIGN PATENT DOCUMENTS

| | | |
|---|---|---|
| 91309141.9 | 10/1991 | European Pat. Off. . |
| 92401925.0 | 7/1992 | European Pat. Off. . |
| 93307267.0 | 9/1993 | European Pat. Off. . |
| 91108116.4 | 5/1991 | Germany . |
| PCT/GB89/01013 | 8/1989 | WIPO . |
| PCT/US91/01453 | 3/1991 | WIPO . |
| PCT/JP93/01471 | 10/1993 | WIPO . |

OTHER PUBLICATIONS

A Microcomputer–Based UPS Battery Management System, Noworolski et al., IEEE 1991, Polytronics Engineering Ltd., Mississauga, Ontario, Canada, CH2992–6/91/000–0475.

*Primary Examiner*—Peter S. Wong
*Assistant Examiner*—Aditya Krishnan
*Attorney, Agent, or Firm*—Steven F. Caserza; Flehr, Hohbach, Test, Albritton & Herbert

[57] ABSTRACT

A battery system includes intelligence to allow the battery system to control various aspects of the charging and discharging of the battery, as well as to constantly monitor the battery voltage, temperature, current charge/discharge rate, and remaining capacity of the battery. The intelligent battery system is capable of being charged from a simple voltage supply, with all aspects of charge/discharge rate control and monitoring being accomplished as a function of the intelligent battery system itself, rather than as part of an external charging circuit, or an external electronic device to be powered by the intelligent battery system. This alleviates the need for external systems to include such circuitry and control elements and allows, if desired, a variety of intelligent battery systems to be developed for use with a given electronic system or family of electronic systems, with each battery being able to control its own charge/discharge rates and monitoring functions. The intelligent battery system is capable of communicating with an external device such as a computer powered by the intelligent battery system, in order to provide an indication of the charge/discharge rate, the state of the battery charge, and the like.

68 Claims, 2 Drawing Sheets

SMART BATTERY SYSTEM AND INTERFACE

TECHNICAL FIELD

This invention pertains to battery systems, and more specifically to an intelligent battery system for operating, for example, electronic devices, which battery system includes sufficient intelligence to control its charge rate, reduce discharge losses, and the ability to communicate with external systems.

DESCRIPTION OF PRIOR ART

FIG. 1 is a block diagram of a typical electronic system 100 including electronic device 101 which is capable of being powered by battery 105. Also shown in system 100 is a power supply device 102 which is capable of directly powering electronic device 101 or, through switch 104, charging battery 105. Diode 103 serves to prevent battery 105 from charging while power supply 102 is providing a current to electronic device 101 and switch 104 is used to allow power supply 102 to charge battery 105 when desired.

There are a number of disadvantages with the typical prior art system 100 of FIG. 1. First, the use of diode 103 to prevent the inadvertent charging of battery 105 by power supply 102 necessarily results in a lower voltage being available to electronic device 101 when electrical device 101 is powered by battery 105, due to the inherent voltage drop across a forward biased diode 103. Furthermore, in the event that battery 105 is to be rapidly charged by power supply 102, voltages may need to be provided by power supply 102 which are above the normal operating voltage of electronic device 101, which would necessitate an additional circuitry to ensure such rapid charging does not take place when electronic device 101 is turned on.

Some prior art batteries available on the market include certain electronic devices for safety reasons, such as an internal fuse which is blown when excessive current is forced into or drawn from the battery. Other prior art batteries include internal safety features such as thermistors or thermal fuses which open if current and/or temperature limits are exceeded.

Certain prior art systems provide some measure of the battery charge status. This is typically done by measuring the voltage of battery 105 to provide a rough approximation as to the state of its charge. This is intended to provide the user of electronic device 101 an indication of how much longer device 101 can be operated from battery 105, and to encourage more complete discharge of battery 105 prior to its recharge. This is important, for example, when utilizing nickel cadmium (nicad) batteries which tend to have a "memory" which causes a reduction in their effective charge capacity unless they are fully charged and discharged.

Other prior art systems 100 determine some indication of the state of the battery charge by measuring the number of coulombs charged and discharged from battery 105. However, this requires electronic device 101 to be actively involved in monitoring the amount of coulombs charged to and discharged from battery 105 while battery 105 remains physically connected to electronic device 101. Replacing battery 105 with another battery, whose state of charge is not known, negates the effectiveness of this prior art technique.

Each of these prior art techniques which attempt to monitor this charge status of battery 105 is less accurate than is desirable, because reference data must be generic, thereby reducing the accuracy of the indication. This in turn can cause overcharge or overdischarge conditions. As a result, typical nicad and nickel metal hydride batteries provide approximately 500 charging cycles if conditions are optimal. The number of charging cycles is limited by the capabilities of the battery technology, as well as due to poor charging and discharge habits of users, through no fault of their own, due to the limitations in the prior art of monitoring the charge/discharge state of battery 105 and controlling charge and discharge rates.

Accordingly, it is desirable to provide an improved accuracy charge/discharge monitoring and control mechanism, which will more accurately reflect the state of charge of a battery and provide a user with a better indication of the amount of time a system can be run off a given battery at its given state of charge. Such an improvement would also allow better maintenance of batteries by allowing batteries to be charged and discharged more consistently and more in accordance with the optimum charge and discharge utilizations of a given battery technology, thereby enhancing battery lifetime.

SUMMARY

In accordance with the teachings of this invention, a novel battery system is taught which includes intelligence to allow the battery system to control various aspects of the charging and discharging of the battery, as well as to constantly monitor the battery voltage, temperature, current charge/discharge rate, and remaining capacity of the battery. In this manner, an intelligent battery system of this invention is capable of being charged from a simple voltage supply, with all aspects of charge/discharge rate control and monitoring being accomplished as a function of the intelligent battery system itself, rather than as part of an external charging circuit, or an external electronic device to be powered by the intelligent battery system. This alleviates the need for external systems to include such circuitry and control elements and allows, if desired, a variety of intelligent battery systems to be developed for use with a given electronic system or family of electronic systems, with each battery being able to control its own charge/discharge rates and monitoring functions. In accordance with the teachings of this invention, the intelligent battery system is capable of communicating with an external device such as a computer powered by the intelligent battery system, in order to provide an indication of the charge/discharge rate, the state of the battery charge, and the like.

DESCRIPTION OF SPECIFIC EMBODIMENTS

Figure 1:
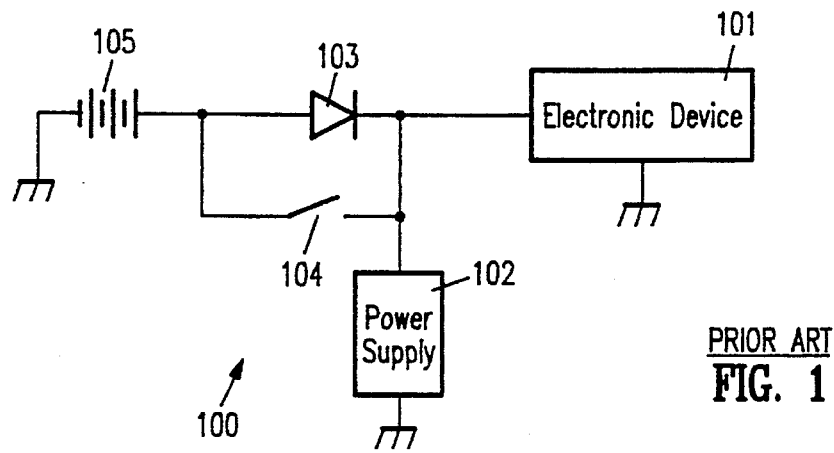
FIG. 1 is a diagram depicting a typical prior art battery powered electronic system.
Figure 2:
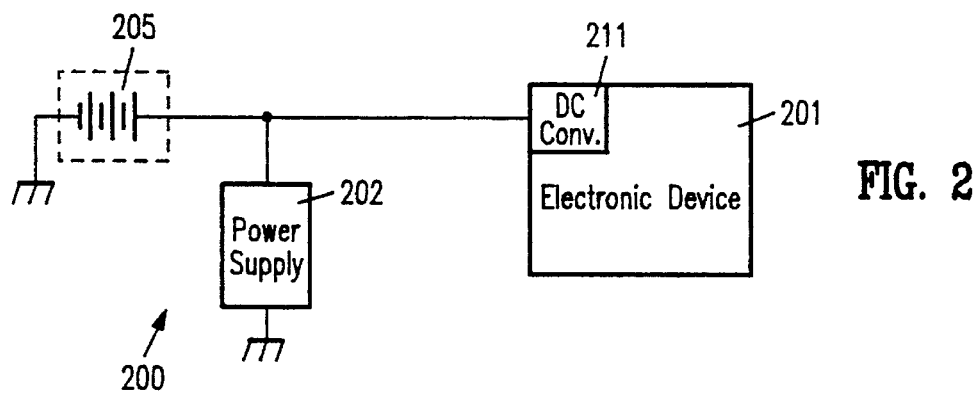
FIG. 2 is a diagram depicting generally one embodiment of the present invention.

FIG. 2 is a block diagram of one embodiment of a smart battery system and interface in accordance with the teachings of this invention. System 200 includes electronic device 201, smart battery 205, and power supply 202 which is capable of being connected when it is desired to operate electronic device 201 directly from power supply 202 and/or when power supply 202 is to recharge smart battery 205 (with or without electronic device 201 being connected). Electronic device 201 includes, if necessary, DC converter 211 which is capable of providing AC or DC voltages to various portions of electronic device 201 other than the DC voltage made available to electronic device 201 by smart battery 205 and/or power supply 202.

Figure 3:
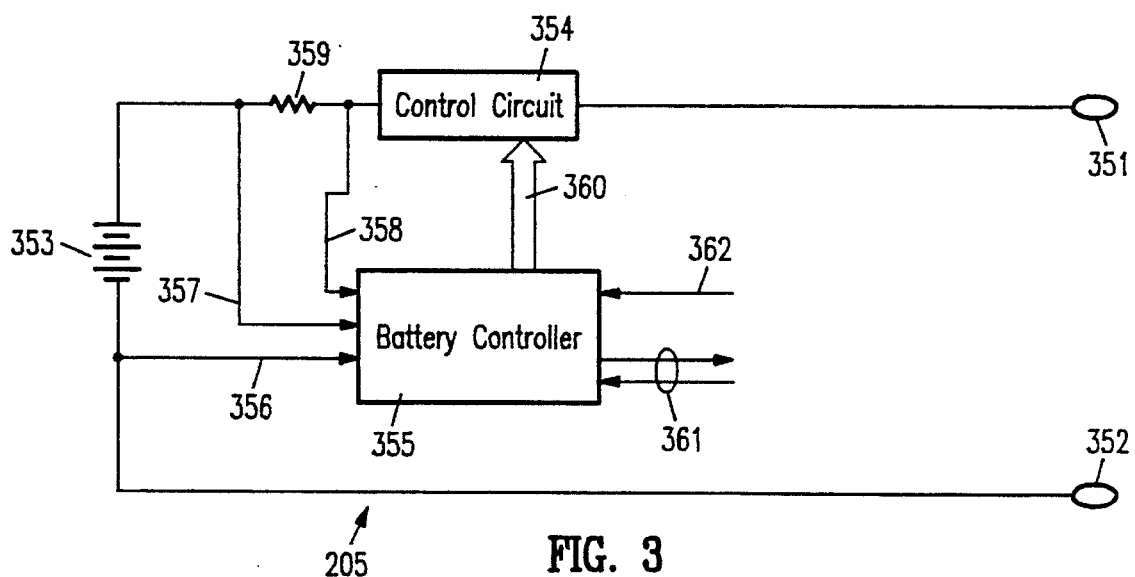
FIG. 3 is a diagram depicting one embodiment of a battery system constructed in accordance with the present invention.

FIG. 3 is a block diagram showing more detail of one embodiment of smart battery 205. Smart battery 205 includes a battery 353, which can be any desired rechargeable battery of appropriate voltage and charge capacity for operating electronic device 201 of FIG. 2. In this embodiment, the negative terminal of battery 353 is connected to negative terminal 352, and the positive terminal of battery 353 is coupled through appropriate control circuitry 354 to positive terminal 351. Alternatively, control circuit 354 can be located in the negative battery path, or in both positive and negative battery paths. The control circuitry in this embodiment includes a low resistance device 359, such as for example a 0.1 ohm resistor, which will develop a small voltage across it which can be monitored to determine the amount of current flowing into or out of battery 353 as it is charged and discharged. Alternatively, a current sensing MOSFET can be used as current sensing element 359. Control circuitry 354 serves to control the charging and discharging of battery 353 based upon the voltage applied to terminal 351 and under the control of battery controller 355.

Battery controller 355 receives the voltage across the low resistance device 359 via leads 357 and 358 in order to monitor the current flowing into and out of battery 353 at any given time. Current and time data are used by battery controller 355 to determine the state of charge of battery 353. Battery controller 355 also receives via leads 356 and 357 the battery voltage of battery 353. Battery controller 355 applies control signals via bus 360 to control circuitry 354 in order to control, as desired, the charge and discharge of battery 353. Battery controller 355, in this embodiment, also includes communication port 361, such as an RS-232 serial port, connected to external circuitry, for example to electronic device 201 which is powered by smart battery and interface 205, for receiving inquiries and providing replies, for example, indicating various information about smart battery 205 and its status. Such information includes, for example, a measure of the battery voltage of battery 353, a measure of the charge state of battery 353 as measured by the amount of current charged and discharged by battery 353, the instantaneous charge/discharge current of battery 353, and any status or error conditions which have been noted by battery controller 355.

In one embodiment battery controller 355 also receives via bus 362, which is connected to electronic device 201, a status signal indicating the status of the electronic device. This status signal received via bus 362, in one embodiment, allows battery 353 to be rapidly charged by an external power supply connected to terminals 351 and 352 when the status signal received indicates that the electronic device is turned off, but only allows a trickle charge to be applied to battery 353 when that external device is indicated as being turned on. This allows a limited amount of current available from an external power supply to be applied as a first priority to a powered up electronic device in the event that limited amount of current available from external power supply is insufficient to both power the electronic device and simultaneously rapidly charge battery 353.

In one embodiment of this invention, the external power supply 202 (FIG. 2) is simply a voltage regulated supply, with other requirements with respect to current and voltage concerns when rapidly or trickle charging battery 353 being provided by control circuitry 354 in conjunction with battery controller 355, thereby allowing low cost readily available regulated power supplies to be used as power source 202, rather than a more complex power supply which would otherwise necessitate the inclusion of specialized circuitry for properly controlling the rate of charge of battery 353 under various conditions. Alternatively, control circuitry 354 includes charging circuitry with the electrical characteristics, such as constant current charging necessitated by cell technology used in battery 353. This allows for changes in battery 353 technology without the need to change the characteristics of power supply 202.

Figure 4:
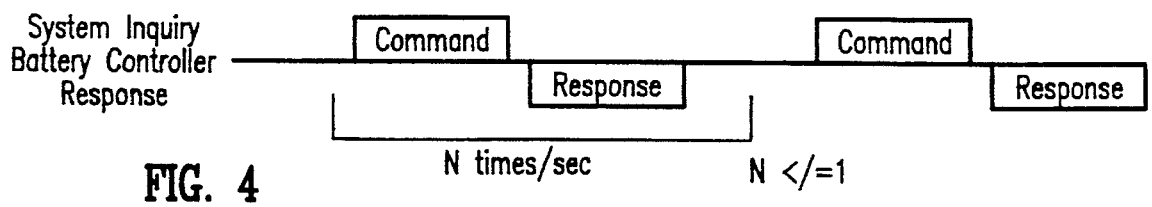
FIG. 4 is a timing diagram of command and response data communications in accordance with one embodiment of the present invention.

In one embodiment, communication via communication port 361 is achieved as shown in the timing diagram of FIG. 4. As shown in FIG. 4, a system inquiry is sent via serial port 361 to battery controller 355 by an external device, such as a computer system being powered by smart battery 205. Sometime after the receipt of this system inquiry, battery controller 355 sends a reply signal to the system inquiry. Table 1 shows a set of command codes sent by an external system to battery controller 355 via bus 361 to make an inquiry are defined, and the associated responses from battery controller 355, in accordance with one embodiment.

TABLE 1

| INQUIRY COMMAND | BATTERY CONTROLLER RESPONSE |
|---|---|
| capacity? | # of watt hours |
| current? | # of amps, and sign |
| voltage? | # of volts |
| battery status? | low/bad/ok/failure type |
| charge status? | charge/discharge |

In one embodiment of this invention, interface signals applied to battery controller 355 via bus 362 from an external system are defined as shown in Table 2.

TABLE 2

| Acronym | Description | Functional Description |
|---|---|---|
| ACSTS | Input to battery from power supply indicating AC power is present | High (open collector transistor off) when AC is not present. Shall go to high state within 15 ms at removal if AC input Low (open collector transistor on) when AC is present and DC output from power supply is within the proper operating range. |
| BATTIN | Lockout to prevent discharge of the battery unless connected to the proper system and/or charger. BATTIN signal must be connected to the battery output in the system or the power supply otherwise the battery cannot be discharged or charged and self discharge is | Connects to DC voltage output from power supply and to control circuit power in battery. Power output of battery connected to BATTIN inside system and power supply (charger). |

TABLE 2-continued

| Acronym | Description | Functional Description |
| --- | --- | --- |
| | minimized | |
| BATTSIG RTN | Signal ground return | Connects to Battery Return inside battery and to return close to control circuits communicating with battery inside power supply and system (not connected to the battery return in the system or power supply and charge |
| WS STATUS | Output from system to inform battery if system is operating and thus using most of the power available from the power supply. When active battery must only accept trickle charge from power supply. | High (open collector transistor off) when system is not operating.<br><br>Low (open collector transistor on) when system is operating. |
| BATT TXD | Output from battery transmitted per RS 232 standard TTL levels information from the battery requested by the system. Commands from system sent to battery on BATT RXD. | The battery responds on this line to commands from the system. |
| BATT RXD | Input to battery transmitted per RS 232 standard TTL levels commands from the system of information needed from the battery. Response from battery on BATT TXD. | The system will request information from the battery at intervals of, for example, 1 second or more. The information shall be provided as data from the battery after the battery receives a command from the system. |

Figure 5:
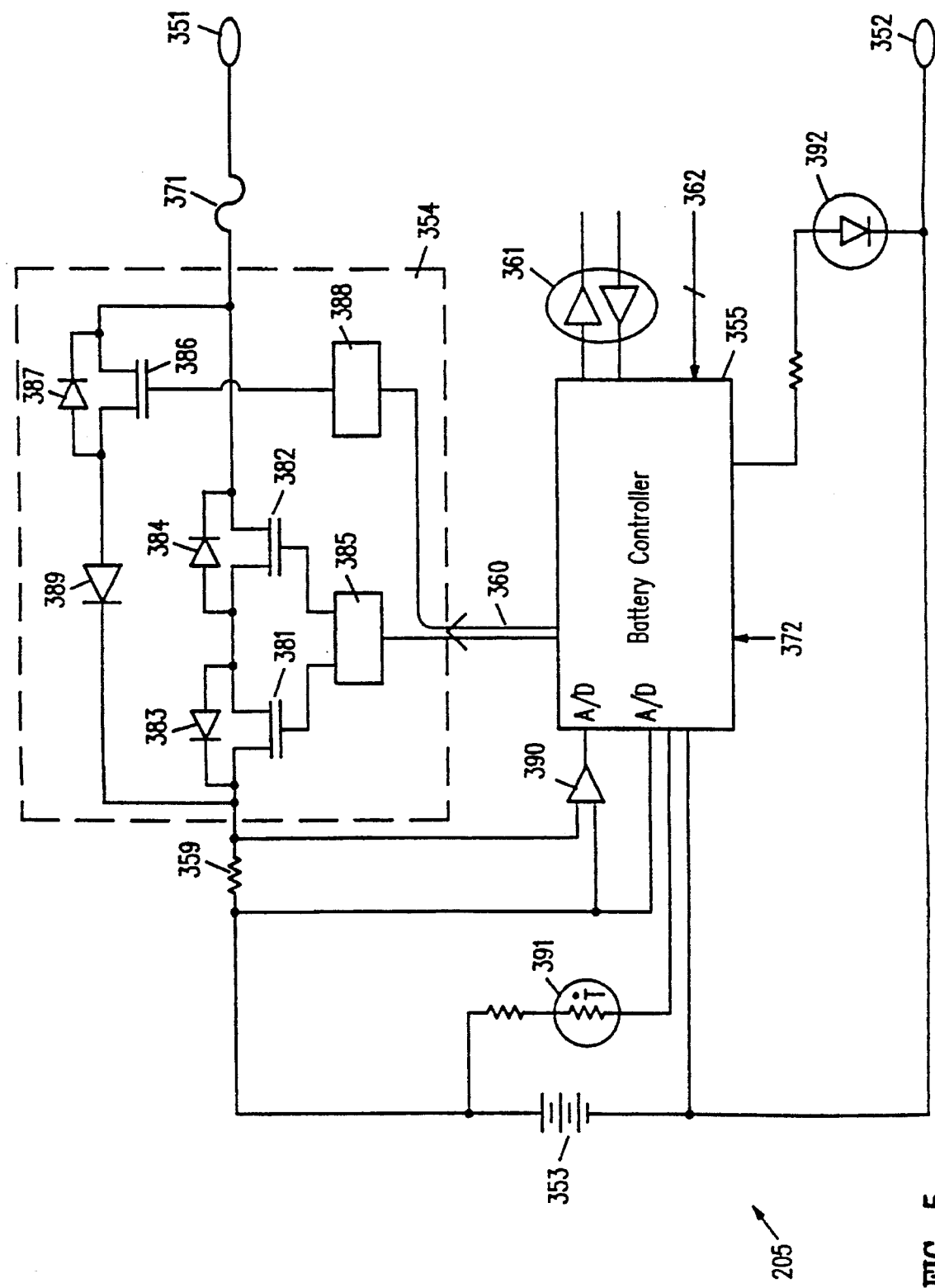
FIG. 5 is a schematic diagram depicting one embodiment of a battery system constructed in accordance with the present invention.

FIG. 5 is a more detailed diagram depicting one embodiment of smart battery 205. Shown in the embodiment of FIG. 5 are buffers used in conjunction with communication port 361, as well as differential amplifier 390 used to amplify the voltage across resistive element 359, with the result being applied to an analog-to-digital converter input lead of battery controller 355. The voltage of battery 353 is also applied to an analog-to-digital converter input lead of battery controller 355, thereby allowing digital processing of the charge/discharge current of battery 353 as measured by the voltage across resistive device 359, and digital processing of the voltage of battery 353. In the embodiment shown in FIG. 5, battery controller 355 also receives an AC status signal via lead 372 which indicates when power supply 202 (FIG. 2) is providing DC power to terminals 351 and 352. Alternatively, this indication can be determined by other means, such as the voltage level appearing on terminal 351.

Control circuitry 354 in the embodiment of FIG. 5 includes a high current path consisting of transistors 381 and 382 and their related components, as well as a trickle charge path provided by transistor 386 and its related components.

The high current path provided by transistors 381 and 382 is used for the discharge of battery 353, i.e. when battery 353 supplies current to terminals 351 and 352 to power electronic device 201 (FIG. 2). Alternatively, this high current path is also used when battery 353 is being rapidly charged via terminal 351 by external power supply 202 (FIG. 2). In contrast, the charge path provided by transistor 386 and its related components is used when external power supply 202 is powered up and a low charge current is desired to charge battery 353, for example as discussed above when external power supply 202 is simultaneously powering electronic device 201.

The high current path includes transistor 381 and 382 which are driven by driver 385 under the control of signals from battery controller 355 via bus 360. In one embodiment of this invention, driver 385 includes a charge pump for providing a gate voltage to transistors 381 and 382 in excess of the maximum voltage of battery 353, thereby providing a high gate voltage in excess of the source voltage to turn on MOSFETs 381 and 382. Diodes 383 and 384 are inherently formed as part of MOSFETs 381 and 382, respectively, and transistors 381 and 382 are connected as shown in the embodiment of FIG. 5 so that diodes 383 and 384 are in a back-to-back fashion in order to prevent current flow in MOSFETs 381 and 382 when they are turned off.

The trickle charge path formed by transistor 386 and its related components includes diode 389 connected to prevent discharge of battery 353 through transistor 386 in order to assure MOSFETs 381 and 382 are the only discharge path. The inherent diode 387 formed as part of transistor 386 is oriented in the polarity shown in FIG. 5 in order to assure transistor 386 controls charge current. The gate of trickle charge transistor 386 is driven by driver 388 in response to control signals received from battery controller 355 via bus 360. In one embodiment of this invention, driver 388 includes a charge pump such that the gate voltage applied to transistor 386 can be in excess of the maximum voltage of battery 353 in order to provide a voltage greater than the source voltage to the gate of MOSFET 353 to turn it on when charging.

Also shown in the embodiment of FIG. 5 is fuse 371 which prevents excessive current flow. In one embodiment of this invention, fuse 371 comprises a thermistor which serves as a resetting type fuse device.

In one embodiment of this invention, battery controller 355 is powered by battery 353, allowing battery controller 355 to retain its information even when battery 205 is removed from any external system. Retaining information allows battery system 205 to maintain a history of its operation in memory circuits that are part of or connected to controller 355. Information such as the number of times the battery has been recharged can be used by controller 355 to adjust charge current rate or charge voltage to maximize battery cycle life. Alternatively the number of times battery 353 is discharged and charged, known as cycle life, is communicated to the external electronic system informing the user of the remaining battery life. In an alternative embodiment, battery controller 355 is powered by an external means, for example by a feedback line from electronic device 201, so that battery controller 355 is only powered up when electronic device 201 is powered up, or when electronic device 201 instructs battery controller 355 to be powered up. In either of these alternative embodiments, it is a feature of certain embodiments that battery controller 355 include some form of non-volatile memory such that various operating information, such as a cumulative current flow through resistor device 359, indicative of the number of coulombs charged and discharged from battery 353, is maintained even in the absence of power supplied to battery controller 355.

In one embodiment of this invention, battery controller 355 is clocked at a slow rate, for example 1 Khz, in order to minimize power consumption. In an alternative embodiment, battery controller 355 is clocked at different rates, depending on the activity level. Thus, for example, during periods of time when battery 353 is being charged or discharged, a higher clock rate is used to control battery controller 355 than when battery 353 is not being charged or discharged, thus providing a "sleep mode" for battery controller 355 in order to save energy when charge/discharge activity of 353 is not occurring. In one embodiment of this invention, the clock rate is determined by controller 355 such that a reduced clock rate is used if there is no charge or discharge activity after a predefined period of time. Conversely, when charge or discharge activity is detected, controller 355 causes a higher clock rate to be used. Alternatively, a system command provided by an external system, such as a computer system being powered by battery 353, defines which of a plurality of clock rates is to be used by battery controller 355 at any given time.

In one embodiment of this invention, the following parameters and devices are used:

TABLE 4

| | |
|---|---|
| Battery 353 nominal voltage | 14.4 volts |
| Maximum charge voltage | 17.2 volts |
| Cutoff voltage | 10 volts |
| Maximum current delivery from battery 353 | 6 amps |
| Trickle charge current | 0.5 amp |
| Fast charge current | 3.5 amps |
| Drivers 385 and 388 | LTC 1255 FET drivers (Linear Technology) |
| Transistors 381 and 382 | IRF 1010 MOSFET, 50 volt breakdown, $R_{on} = 0.014$ ohms (International Rectifier Corp.) |

Naturally, these device sizes are exemplary only, and are easily selected based upon the voltage and current requirements of smart battery 205.

Discharge of battery 351 at voltages below cutoff is preferably not allowed, in order to avoid battery degradation and to achieve maximum battery life and charge/discharge cycles. Turning off transistor 381 prevents discharge as battery controller 355 determines that the voltage of battery 353 falls to the cut off voltage, which in one embodiment is 10 volts. The battery preferably returns to normal operation once the output voltage is in the operating range and it recharged to a useable level, in one embodiment about 25% of the battery's fully charged state. Battery controller 355 is able to determine the charge state of battery 353 by monitoring the voltage of battery 353 and the charge current over time, in order to determine when battery 353 has reached such usable recharge level prior to allowing transistors 381 and 382 to conduct current from battery 353 to power a system.

Battery 353 is preferably capable of providing up to the maximum rated output current (in one embodiment 6 amps) if the output voltage is within the voltage range. The battery must be capable of the 6 A discharge rate when ever it is connected to the host system and the BATTIN signal is provided and the capacity is at a useful charge level. Battery system 205 preferably protects itself from overload conditions, by battery controller 355 monitoring the charging and discharging current through resistive element 359, and causing MOSFET 381 to turn off if the maximum discharge current is exceeded, and causing MOSFET 382 to turn off if the maximum charge current is exceeded.

In one embodiment, the charger (not shown) is a constant voltage power limited power supply which is also capable of powering the electronic system, such as a computer system, which battery system 205 is to power. Charge control circuits within battery system 205 limit the current drawn to a predefine level, for example 0.50 amps, from the power supply when the power supply is also powering the electronic system. A signal is provided to battery system 205 via bus 362 indicating the electronic system is operating, and thus drawing current from the charging supply, necessitating the reduced charge current to battery system 205.

In one embodiment of this invention, the battery charge control circuits assure battery 353 returns to at least 90% of full charge within 2 hours when charged at the maximum charge rate (fast charge), which in the embodiment of Table 4 is a charge rate of 3.5 amps. Alternatively, the battery charge control circuits assure battery 353 returns to at least 90% of full charge within 12 hours when charged at the background (trickle) charge rate (0.5 amps in the embodiment of Table 4) after complete discharge of battery 353.

Battery controller 355 assures that charging path transistor 382 is off and thus battery 353 is disconnected from terminal 351 without damage to battery 353 in the event the input charge voltage exceeds the maximum allowed for battery 353. Battery controller 355 automatically turns on transistor 382 and thus reconnects battery 353 to terminal 351 once the input charge voltage is within the acceptable operating range, and the battery system is reset upon receipt of a BATTIN signal from an external system. Alternatively, battery controller 355 monitors the voltage applied to terminals 351 and 352 to detect an overvoltage in order to turn off control circuitry 354 and to detect a subsequent correction of the overvoltage problem in order to once again turn on control circuitry 354.

In one embodiment battery system 205 is self-protecting against overheating conditions. The thermal protection assures battery system 205 will not cause a hazardous failure or leakage of material from battery 353. If battery system 205 is exposed to temperatures above the maximum operating temperature, for example 50° C., temperature sensor 391 provides a signal so indicating to battery controller 355. In this event, battery controller 355 provides appropriate control signals to MOSFET driver 385 to turn off MOSFETs 381 and 382. This prevents electrical stress of charge or discharge of battery 353 during a period of time when the temperature of battery 353 is excessive. If desired, MOSFET 386 is turned off to also eliminate trickle charging when temperature is excessive.

In one embodiment, charge indicator 392 (such as a light emitting diode (LED)) is provided and controlled by battery controller 355 to indicate when battery 353 is being charged. LED 392 can be turned off when battery 353 reaches a full charge or charging otherwise ceases. Alternatively, LED 392 is a two color LED (or two separate LEDs) with a first color indicating battery charging and a second color indicating battery 353 has reached and is storing a full charge. Preferably, during discharge LED 392 is not illuminated, in order to conserve battery power intended to power the electronic system.

The invention now being fully described, it will be apparent to one of ordinary skill in the art that many changes and modifications can be made thereto without departing from the spirit or scope of the appended claims.

What is claimed is:

1. An intelligent battery system comprising:

a first and a second battery system supply voltage terminal;

a battery having a first and a second supply voltage terminal;

control circuitry coupled between said battery system supply voltage terminals and said battery; and a battery controller coupled to said control circuitry having input leads for monitoring the state of the battery and in response thereto controlling the charge and discharge current flowing between said battery system supply voltage terminals and said battery by means of said control circuitry;

wherein said monitoring comprises monitoring said charge and discharge current over time to maintain an indication of the charge state of said battery.

2. An intelligent battery system as in claim 1 wherein said battery controller monitors the voltage of said battery to detect an overvoltage condition and in response thereto cause said control circuitry to disconnect said battery from said battery system supply voltage terminals.

3. An intelligent battery system as in claim 1 wherein said battery controller monitors the charge current of said battery to detect an excessive charge current condition and in response thereto cause said control circuitry to disconnect said battery from said battery system supply voltage terminals.

4. An intelligent battery system as in claim 1 wherein said battery controller monitors the discharge current of said battery to detect an excessive discharge current condition and in response thereto cause said control circuitry to disconnect said battery from said battery system supply voltage terminals.

5. An intelligent battery system as in claim 1 which further comprises a communication link between said battery controller and an external system in order to allow said battery controller to communicate with said external system.

6. An intelligent battery system as in claim 5 wherein said battery controller communicates with said external system as to the state of charge of said battery.

7. An intelligent battery system as in claim 1 wherein said battery controller monitors the temperature of said battery to detect an out-of-range temperature condition and in response thereto cause said control circuitry to disconnect said battery from said battery system supply voltage terminals.

8. An intelligent battery system as in claim 1 wherein said control circuitry includes a high current charge/discharge path and a low current charge path.

9. An intelligent battery system as in claim 8 wherein said control circuitry further comprises:

a first driver for receiving signals from said battery controller and in response thereto controlling said high current charge/discharge path; and a second driver for receiving signals from said battery controller and in response thereto controlling said low current charge/discharge path.

10. An intelligent battery system as in claim 9 wherein one or both of said high current charge/discharge path and said low current charge path comprise MOSFETs.

11. An intelligent battery system as in claim 10 wherein one or both of said first and second drivers include charge pump circuitry for providing a drive signal to a MOSFET in its associated current path, said drive signal being a voltage greater than the voltage of said battery.

12. An intelligent battery system as in claim 1 wherein said battery controller monitors the presence of an external charging voltage to said battery system supply voltage terminals in order to control the operation of said control circuitry to allow charging of said battery when said external charging voltage is present.

13. An intelligent battery system as in claim 12 wherein said battery controller also monitors current drawn by an external system connected to said battery system supply voltage terminals in order to determine the rate at which to charge said battery.

14. An intelligent battery system as in claim 13 wherein said control circuitry includes a high current charge/discharge path and a low current charge path and said battery controller provides a rapid charge via said high current charge/discharge path when said external system is not consuming power from said external voltage source.

15. An intelligent battery system as in claim 14 wherein said battery controller causes said high current charge/discharge path to open and allows the low rate of charge of said via said low current charge path when said external system is consuming power from said external voltage source.

16. An intelligent battery system as in claim 1 which further comprises a low resistance device connected in series with said battery in order to allow said battery controller to monitor the charge and discharge current of said battery.

17. An intelligent battery system as in claim 1 wherein said battery controller causes said control circuitry to prevent discharge of said battery when said battery voltage drops below a cutout voltage.

18. An intelligent battery system as in claim 17 wherein said battery controller prevents said discharge of said battery until the battery voltage reaches a pre-defined voltage level and said battery is recharged to a predefined amount of its storage capacity.

19. An intelligent battery system as in claim 1 wherein said battery controller utilizes a clock signal having a clock rate dependent on the activity of said intelligent battery system.

20. An intelligent battery system as in claim 19 wherein said clock rate is reduced during periods of no charge or discharge activity of said battery.

21. An intelligent battery system as in claim 19 wherein said clock rate is determined by an external device in communication with said battery controller.

22. An intelligent battery system as in claim 1 which further comprises memory accessible by said battery controller for storing information pertaining to said battery.

23. An intelligent battery system as in claim 22 wherein said battery controller sets the charge rate of said battery based upon said information.

24. An intelligent battery system as in claim 23 wherein said information comprises the cycle life of said battery.

25. A method for operating an intelligent battery system comprising a first and a second battery system supply voltage terminal, a battery having a first and a second supply voltage terminal, control circuitry coupled between said battery system supply voltage terminals and said battery, and a battery controller coupled to said control circuitry, said method comprising the steps of causing said battery controller for monitoring the state of the battery and in response thereto control the charge and discharge current flowing between said battery system supply voltage terminals and said battery by means of said control circuitry, wherein said monitoring comprises monitoring said charge and discharge current over time to maintain an indication of the charge state of said battery.

26. A method as in claim 25 further comprising the step of causing said battery controller to monitor the voltage of said battery to detect an overvoltage condition and in response thereto cause said control circuitry to disconnect said battery from said battery system supply voltage terminals.

27. A method as in claim 25 further comprising the step of causing said battery controller to monitor the charge current of said battery to detect an excessive charge current condition and in response thereto cause said control circuitry to disconnect said battery from said battery system supply voltage terminals.

28. A method as in claim 25 further comprising the step of causing said battery controller to monitor the discharge current of said battery to detect an excessive discharge current condition and in response thereto cause said control circuitry to disconnect said battery from said battery system supply voltage terminals.

29. A method as in claim 25 further comprising the step of causing said battery controller to communicate with an external system.

30. A method as in claim 29 wherein said battery controller communicates with said external system as to the state of charge of said battery.

31. A method as in claim 25 further comprising the step of causing said battery controller to monitor the temperature of said battery to detect an out-of-range temperature condition and in response thereto cause said control circuitry to disconnect said battery from said battery system supply voltage terminals.

32. A method as in claim 25 wherein said control circuitry includes a high current charge/discharge path and a low current charge path, a first driver for receiving signals from said battery controller and in response thereto controlling said high current charge/discharge path, a second driver for receiving signals from said battery controller and in response thereto controlling said low current charge/discharge path, wherein one or both of said high current charge/discharge path and said low current charge path comprise MOSFETs, further comprising the step of operating charge pump circuitry for providing a drive signal to a MOSFET in its associated current path, said drive signal being a voltage greater than the voltage of said battery.

33. A method as in claim 25 further comprising the step of causing said battery controller to monitor the presence of an external charging voltage to said battery system supply voltage terminals in order to control the operation of said control circuitry to allow charging of said battery when said external charging voltage is present.

34. A method as in claim 33 further comprising the step of causing said battery controller to also monitor current drawn by an external system connected to said battery system supply voltage terminals in order to determine the rate at which to charge said battery.

35. A method as in claim 34 wherein said control circuitry includes a high current charge/discharge path and a low current charge path and further comprising the step of causing said battery controller to provide a rapid charge via said high current charge/discharge path when said external system is not consuming power from said external voltage source.

36. A method as in claim 35 wherein said battery controller causes said high current charge/discharge path to open and allows the low rate of charge of said via said low current charge path when said external system is consuming power from said external voltage source.

37. A method as in claim 25 further comprising the step of causing said battery controller to control said control circuitry to prevent discharge of said battery when said battery voltage drops below a cutout voltage.

38. A method as in claim 37 further comprising the step of causing said battery controller to prevent said discharge of said battery until the battery voltage reaches a pre-defined voltage level and said battery is recharged to a predefined amount of its storage capacity.

39. A method as in claim 25 wherein said battery controller utilizes a clock signal having a clock rate dependent on the activity of said intelligent battery system.

40. A method as in claim 39 wherein said clock rate is reduced during periods of no charge or discharge activity of said battery.

41. A method as in claim 39 wherein said clock rate is determined by said electronic system in communication with said battery controller.

42. A method as in claim 25 which further comprises the step of storing information pertaining to said battery in memory accessible by said battery controller.

43. A method as in claim 42 further comprising the step of causing said battery controller to set the charge rate of said battery based upon said information.

44. A method as in claim 43 wherein said information comprises the cycle life of said battery.

45. An apparatus comprising:
an electronic system having a first and a second supply voltage terminal; and
an intelligent battery system comprising:
a first and a second battery system supply voltage terminal coupled to said first and second supply voltage terminals of said electronic system;
a battery having a first and a second supply voltage terminal;
control circuitry coupled between said battery system supply voltage terminals and said battery; and
a battery controller coupled to said control circuitry having input leads for monitoring the state of the battery and in response thereto controlling the charge and discharge current flowing between said battery system supply voltage terminals and said battery by means of said control circuitry;
wherein said monitoring comprises monitoring said charge and discharge current over time to maintain an indication of the charge state of said battery.

46. An apparatus as in claim 45 wherein said battery controller monitors the voltage of said battery to detect an overvoltage condition and in response thereto cause said control circuitry to disconnect said battery from said battery system supply voltage terminals.

47. An apparatus as in claim 45 wherein said battery controller monitors the charge current of said battery to detect an excessive charge current condition and in response thereto cause said control circuitry to disconnect said battery from said battery system supply voltage terminals.

48. An apparatus as in claim 45 wherein said battery controller monitors the discharge current of said battery to detect an excessive discharge current condition and in response thereto cause said control circuitry to disconnect said battery from said battery system supply voltage terminals.

49. An apparatus as in claim 45 which further comprises a communication link between said battery controller and said electronic system.

50. An apparatus as in claim 49 wherein said battery controller communicates with said external system via said communications link as to the state of charge of said battery.

51. An apparatus as in claim 45 wherein said battery controller monitors the temperature of said battery to detect an out-of-range temperature condition and in response thereto cause said control circuitry to disconnect said battery from said battery system supply voltage terminals.

52. An apparatus as in claim 45 wherein said control circuitry includes a high current charge/discharge path and a low current charge path.

53. An apparatus as in claim 52 wherein said control circuitry further comprises:
- a first driver for receiving signals from said battery controller and in response thereto controlling said high current charge/discharge path; and
- a second driver for receiving signals from said battery controller and in response thereto controlling said low current charge/discharge path.

54. An apparatus as in claim 53 wherein one or both of said high current charge/discharge path and said low current charge path comprise MOSFETs.

55. An apparatus as in claim 54 wherein one or both of said first and second drivers include charge pump circuitry for providing a drive signal to a MOSFET in its associated current path, said drive signal being a voltage greater than the voltage of said battery.

56. An apparatus as in claim 45 which further comprises an external power source coupled to said battery system supply voltage terminals wherein said battery controller monitors the presence of an external charging voltage to said battery system supply voltage terminals in order to control the operation of said control circuitry to allow charging of said battery when said external charging voltage is present.

57. An apparatus as in claim 56 wherein said battery controller also monitors current drawn by said electronic system connected to said battery system supply voltage terminals in order to determine the rate at which to charge said battery.

58. An apparatus as in claim 57 wherein said control circuitry includes a high current charge/discharge path and a low current charge path and said battery controller provides a rapid charge via said high current charge/discharge path when said electronic system is not consuming power from said external power source.

59. An apparatus as in claim 58 wherein said battery controller causes said high current charge/discharge path to open and allows the low rate of charge of said via said low current charge path when said electronic system is consuming power from said external power source.

60. An apparatus as in claim 45 which further comprises a low resistance device connected in series with said battery in order to allow said battery controller to monitor the charge and discharge current of said battery.

61. An apparatus as in claim 45 wherein said battery controller causes said control circuitry to prevent discharge of said battery when said battery voltage drops below a cutout voltage.

62. An apparatus as in claim 61 wherein said battery controller prevents said discharge of said battery until the battery voltage reaches a pre-defined voltage level and said battery is recharged to a predefined amount of its storage capacity.

63. An apparatus as in claim 45 wherein said battery controller utilizes a clock signal having a clock rate dependent on the activity of said intelligent battery system.

64. An apparatus as in claim 63 wherein said clock rate is reduced during periods of no charge or discharge activity of said battery.

65. An apparatus as in claim 63 wherein said clock rate is determined by said electronic system in communication with said battery controller.

66. An apparatus as in claim 45 which further comprises memory accessible by said battery controller for storing information pertaining to said battery.

67. An apparatus as in claim 66 wherein said battery controller sets the charge rate of said battery based upon said information.

68. An apparatus as in claim 67 wherein said information comprises the cycle life of said battery.

* * * * *